United States Patent

Kishimoto et al.

[11] Patent Number: 5,889,538
[45] Date of Patent: Mar. 30, 1999

[54] INK JET RECORDING APPARATUS

[75] Inventors: Mitsuru Kishimoto; Noboru Ooishi; Kiyoshi Ikeda; Masahiko Shimosugi; Shigenori Koido; Nobutoshi Chigira; Yuko Mine, all of Tokyo, Japan

[73] Assignee: Oki Data Corporation, Tokyo, Japan

[21] Appl. No.: 752,549

[22] Filed: Nov. 20, 1996

[30] Foreign Application Priority Data

Nov. 24, 1995 [JP] Japan ................................. 7-305934
Jan. 30, 1996 [JP] Japan ................................. 8-014218

[51] Int. Cl.$^6$ .............................. B41J 2/21; B41J 2/015
[52] U.S. Cl. ................................. 347/43; 347/20
[58] Field of Search ........................ 347/48, 43, 20, 347/68, 33, 54

[56] References Cited

U.S. PATENT DOCUMENTS

| 4,468,679 | 8/1984 | Suga et al. | 347/20 |
| 5,124,722 | 6/1992 | Moriyama et al. | 347/43 |
| 5,353,051 | 10/1994 | Katayama et al. | 347/43 |
| 5,430,469 | 7/1995 | Shioya et al. | 347/15 |

FOREIGN PATENT DOCUMENTS

| 0 194 852 A2 | 9/1986 | European Pat. Off. . |
| 49-130140 | 12/1974 | Japan . |
| 57-156265 A | 9/1982 | Japan . |
| 58-001562 A | 1/1983 | Japan . |
| 60-193659 | 10/1985 | Japan | 347/20 |
| 01 180353 A | 7/1989 | Japan . |
| 03 136857 A | 6/1991 | Japan . |
| 09 109395 A | 4/1997 | Japan . |
| WO 94 25279 A | 11/1994 | WIPO . |

*Primary Examiner*—N. Le
*Assistant Examiner*—Thinh Nguyen
*Attorney, Agent, or Firm*—Rabin & Champagne, P.C.

[57] ABSTRACT

An ink jet recording apparatus has at least one ink chamber having an orifice through which ink drops are ejected, each ink drop having a variable amount of ink and being ejected at a timing corresponding to the amount of ink; and a controller for causing said ink chamber to eject ink drops therefrom in accordance with print data. The ink drop has an amount of ink in accordance with the level of gradation of the print data and is ejected at a timing in accordance with the amount of ink. The ink chamber may includes a plurality of ink chambers, i.e., black, yellow, magenta, and cyan. A black ink chamber is located at a first distance away from the print medium and ejects black ink drops along line k1. Color ink chambers of yellow, magenta, and cyan are aligned in a plane parallel to the surface of the print medium and oriented so that the color ink drops are ejected toward the print medium along lines k1, k3, and k4, respectively. The color ink chambers eject ink aiming at a point at which the ink drops are merged before they reach the print medium. The point is located at a second distance, which is shorter than the first distance away from the color ink chambers.

18 Claims, 13 Drawing Sheets

| GRADATION DATA | TIMING | LOCATION OF HEAD | DRIVE VOLTAGE |
|---|---|---|---|
| 0 | 0 | — | 0 |
| 1 | $t_1$ | Q1 | V1 |
| 2 | $t_2$ | Q2 | V2 |
| ⋮ | ⋮ | ⋮ | ⋮ |
| 14 | $t_{14}$ | Q14 | V14 |
| 15 | $t_{15}$ | Q15 | V15 |

FIG.11

| PRO-PORTION | AMOUNT OF INK | | TIMING | | ANGLE |
|---|---|---|---|---|---|
| | YELLOW | CYAN | Y | C | $\alpha$ |
| 0 | 0 | 1 | | $t_C$ | $-\theta$ |
| 1 | $m_0$ | $1-m_0$ | $t_{Y1}$ | $t_{C1}$ | $-\alpha_1$ |
| 2 | $2m_0$ | $1-2m_0$ | $t_{Y2}$ | $t_{C2}$ | $-\alpha_2$ |
| ⋮ | ⋮ | ⋮ | ⋮ | ⋮ | ⋮ |
| | | | | | |
| | | | | | |
| k | 1/2 | 1/2 | $t_{Y+C}$ | $t_{Y+C}$ | 0 |
| ⋮ | $1/2+m_0$ | $1/2-m_0$ | ⋮ | ⋮ | ⋮ |
| | $1/2+2m_0$ | $1/2-2m_0$ | | | |
| ⋮ | ⋮ | ⋮ | ⋮ | ⋮ | ⋮ |
| i | | | $\Delta t_S+\Delta t$ | $\Delta t_S$ | |
| ⋮ | ⋮ | ⋮ | ⋮ | ⋮ | ⋮ |
| | $1-2m_0$ | $2m_0$ | | | $+\alpha_2$ |
| n-1 | $1-m_0$ | $m_0$ | | | $+\alpha_1$ |
| n | 1 | 0 | $t_Y$ | | $+\theta$ |

FIG.12

| GRADATION | PULSE WIDTH | TIMING | AMOUNT OF INK |
|---|---|---|---|
| 0 (WHITE) | — | — | — |
| 1 | $W_1$ | $t_{M1}$ | $m_0$ |
| 2 | $W_2$ | $t_{M2}$ | $2m_0$ |
| 3 | $W_3$ | $t_{M3}$ | $3m_0$ |
| 4 | $W_4$ | $t_{M4}$ | $4m_0$ |
| ⋮ | ⋮ | ⋮ | ⋮ |
| n | $W_n$ | $t_{Mn}$ | 1 |

PRINT DATA, INFORMATION ON THE LOCATION OF PRINT HEAD → CPU (3) ↔ I/O (6) → HEAD DRIVER (7) → INK JET HEAD (2); CPU → ROM (4); CPU → RAM (5)

| GRADATION DATA | TIMING | LOCATION OF HEAD | DRIVE VOLTAGE |
|---|---|---|---|
| 0 | 0 | — | 0 |
| 1 | $t_1$ | Q1 | V1 |
| 2 | $t_2$ | Q2 | V2 |
| ⋮ | ⋮ | ⋮ | ⋮ |
| 14 | $t_{14}$ | Q14 | V14 |
| 15 | $t_{15}$ | Q15 | V15 |

INK JET RECORDING APPARATUS

BACKGROUND OF THE INVENTION

The present invention relates to an ink jet recording apparatus used for printing.

For example, with conventional ink jet recording apparatuses used for color printing, the ink drops of four color inks, i.e., yellow, magenta, cyan, and black are ejected through orifices in the ink jet head. The respective color ink drops adhere to the print medium one over the other, forming a dot of a desired color.

The ink jet head has an ink drop generating mechanism made of, for example, a heater or a piezoelectric material. The ink drop generating mechanism is driven in accordance with color information to eject the corresponding color ink drops. Further, each pixel is in the form of, for example, a 4-by-4 dot matrix and the gradation of a printed image may be achieved by varying print density on a pixel-by-pixel basis.

The ink drops are ejected at a timing in accordance with the print resolution (e.g., 300 dpi) of the ink jet recording apparatus. The amount of ink of each of the ejected ink drops is in accordance with the gradation of the print data.

However, the ink drops ejected from the moving ink jet head travel toward the print medium at different initial velocities depending on the amount of ink contained in the ink drop. Therefore, the aforementioned prior art ink jet recording apparatus suffers from a drawback that it is difficult to print an image with the respective color dots accurately registered on the print medium. Inaccurate registration results in ink-spread, misregistration of color inks on each dot location, and deviation of printed dots from correct positions, all of which are the sources of poor print quality. Effecting gradation of color on a pixel-by-pixel basis lowers the resolution of the ink jet recording apparatus by the size of a pixel.

In one method of accurately aiming color ink drops at the same dot location on the print medium that has been proposed, two or three ink drops are deposited consecutively one over the other at the same dot location on the print medium. Each of the color ink drops has the same amount of ink as an ink drop required for printing a full sized single color-dot. Thus, a large amount of ink adhering to one dot location requires a longer time for the ink to dry, resulting in a problem such as ink spread.

SUMMARY OF THE INVENTION

An object of the present invention is to provide an ink jet recording apparatus in which print quality is improved by eliminating ink-spread, misregistration of color ink dots, and mislocation of dots, and in which fine gradation of color is achieved while still maintaining the same resolution.

The object of the invention is achieved by controlling the amounts of ink in ejected ink drops which are to be merged into a single ink drop, so that the total amount of ink after merging is substantially equal to that of a full sized single color-ink drop.

The object of the invention is also achieved by controlling the amount of ink in an ejected ink drop in accordance with the gradation of print data and then ejecting the ink drop at a timing in accordance with the amount of ink contained in the ink drop.

According to the invention, an ink jet recording apparatus has at least one ink pressure chamber having an orifice through which ink drops are ejected, each ink drop having an amount of ink in accordance with print data and being ejected at a timing corresponding to the amount of ink, and a controller for causing the ink pressure chamber to eject ink drops therefrom in accordance with print data. The ink drop may have an amount of ink in accordance with the gradation of the print data and is ejected at a timing in accordance with the amount of ink.

The ink pressure chamber may include a plurality of ink pressure chambers aligned in a plane parallel to the surface of the print medium. Ink pressure chambers are located at a distance L1 away from the print medium and ejects black ink drops along line k1. Color ink pressure chambers are oriented so that the color ink drops are ejected toward the print medium along lines k1, k3, and k4, respectively. The color ink pressure chambers eject the corresponding ink drops aiming at a point at which the ink drops are merged before they reach the print medium. The point is located at a distance L2 away from the color ink pressure chambers.

BRIEF DESCRIPTION OF THE DRAWINGS

FIG. 11 shows a table which lists the level of proportion when mixing of yellow ink and cyan ink, and the corresponding timing and angle α corresponding to the level of proportion.

FIG. 12 shows a table which lists gradation and the corresponding pulse width, timing, and amount of ink for magenta.

DETAILED DESCRIPTION OF THE INVENTION

Embodiments of the invention will be described in detail with reference to the accompanying drawings.

First Embodiment

Figure 1:
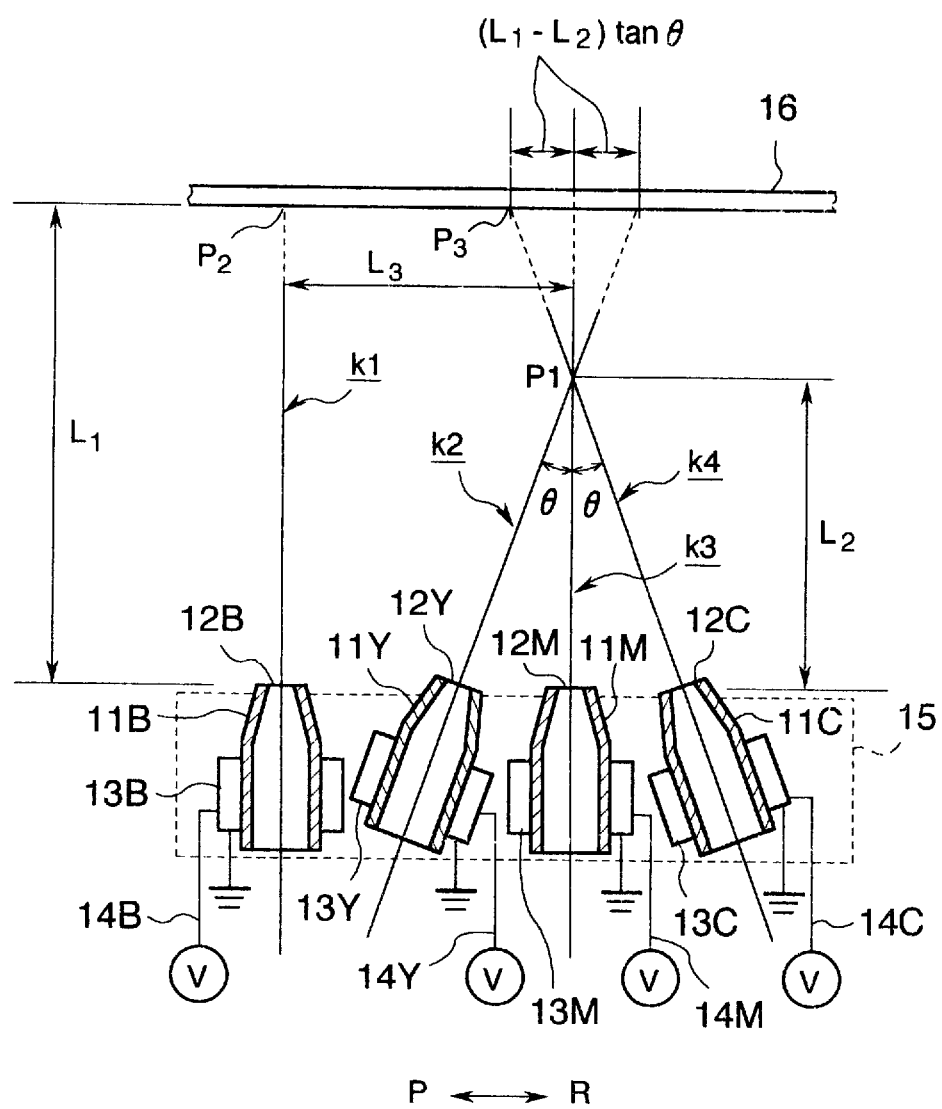
FIG. 1 illustrates a general construction of an ink jet head according to a first embodiment of the invention.

FIG. 1 illustrates a general construction of an ink jet head according to a first embodiment of the invention.

Referring to FIG. 1, ink pressure chambers 11Y, 11M, 11C, and 11B are filled with yellow ink, magenta ink, cyan ink, and black ink, respectively, and have orifices 12Y, 12M, 12C, and 12B, respectively. Each of the orifices has a diameter of 30–50 $\mu$m.

The ink pressure chambers 11Y, 11M, 11C, and 11B have piezoelectric elements 13Y, 13M, 13C, and 13B, respectively, disposed on their outer surfaces. The piezoelectric elements 13Y, 13M, 13C, and 13B are substantially in the shape of a cylinder and are connected via wires 14Y, 14M, 14C, and 14B, respectively, to the corresponding power supplies V and are controllably driven in accordance with the color information in print data.

All the ink pressure chambers are disposed on an ink Jet head 15, which is at a distance L1 away from the print medium 16 and is moved in directions shown by arrow P and R perpendicular to the direction of movement (which is normal to the page) of the print medium 16 during printing. The ink pressure chamber 11B is oriented so that black ink is ejected along line k1 extending substantially perpendicular to a print medium 16. The ink pressure chambers 11Y, 11M, and 11C are oriented so that the color inks are ejected along lines k2, k3, and k4, respectively. The lines k2, k3, and k4 cross one another at point P1 away from the ink pressure chambers by a distance L2. The distance L2 is shorter than a distance L1. A distance L3 represents a distance from the point P1 to the line k1 and is determined by L3=85$n$ microns for a resolution of 300 dpi where n is an integer.

The line k2 makes an angle of $\theta$ with the line k3 and line k3 makes an angle of $\theta$ with the line k4. The angle $\theta$ is selected such that $\theta = \tan^{-1}\{85/(L1-L2)\}$. When the piezoelectric elements 13Y, 13M, 13C, and 13B are driven in accordance with color information, the respective piezoelectric elements are deformed to pressurize the ink in the ink pressure chambers. As a result, ink drops of the respective color inks are ejected in the form of ink drops through the orifices 12Y, 12M, 12C, and 12B and adhere to the print medium 16 to form dots.

The ink pressure chambers shown in FIG. 1 operate in two modes, i.e., single-color print mode and merged color print mode.

Figure 2:
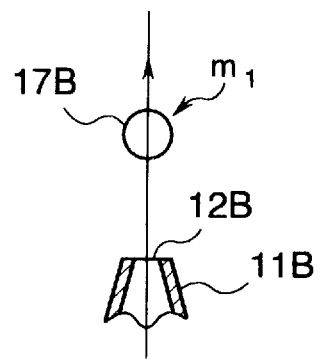
FIG. 2 illustrates an ink drop ejected by an ink pressure chamber of black ink.

FIG. 2 illustrates one example of the single-color print mode where an ink drop of black ink is ejected by an ink pressure chamber 11B. When dots are to be printed by black ink only, the orifice 12B ejects black ink drops 17B, which has an amount of about ml as shown in FIG. 2.

Figure 3:
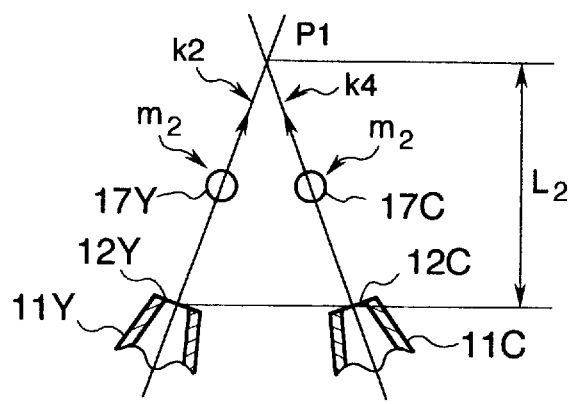
FIG. 3 illustrates ink drops ejected by ink pressure chambers of yellow and cyan inks.
Figure 4:
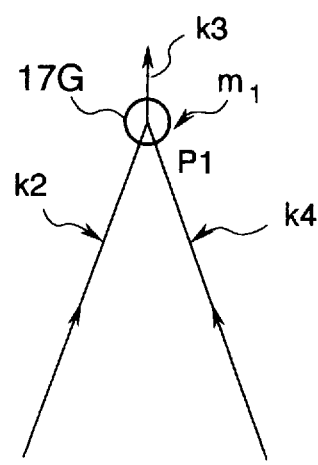
FIG. 4 illustrates an ink drop and its direction of travel resulting from the merging of yellow and cyan ink drops.

FIG. 3 illustrates one example of the merged color print mode where ink drops are ejected by ink pressure chambers of yellow and cyan inks. FIG. 4 illustrates an ink drop and its direction of travel resulting from the merging of yellow and cyan ink drops shown in FIG. 3.

If a green dot is printed by mixing yellow ink and cyan ink, the orifice 12Y ejects an ink drop 17Y of cyan having an amount of m2=m½ while at the same time the orifice 12C ejects an ink drop 17C having an amount of m2=m½ as shown in FIG. 3. The ink drops 17Y and 17C travel along the lines k2 and k4, respectively. Since the ink drops 17C and 17Y have the same amount m2=m½, i.e., the same weight and travel at the substantially the same velocity, the ink drops 17C and 17Y have substantially the same momentum. The ink drops 17C and 17Y are therefore vectorially added together at the point P1 into a resultant green ink drop 17G having an amount of about m1, and the green ink drop 17G then travels in the direction of the line k3 perpendicular to the print medium 16 as shown in FIG. 4 to print a green dot on the print medium 16.

If a dot of a desired color is to be printed by mixing other colors, then the orifices 12Y, 12M, and 12C eject ink drops each of which having a proportion different from others. Each ink drop is ejected at a different timing and initial velocity from others, and travels toward point P1 where the ink drops are merged into a full sized single ink drop of the desired color.

Figure 5:
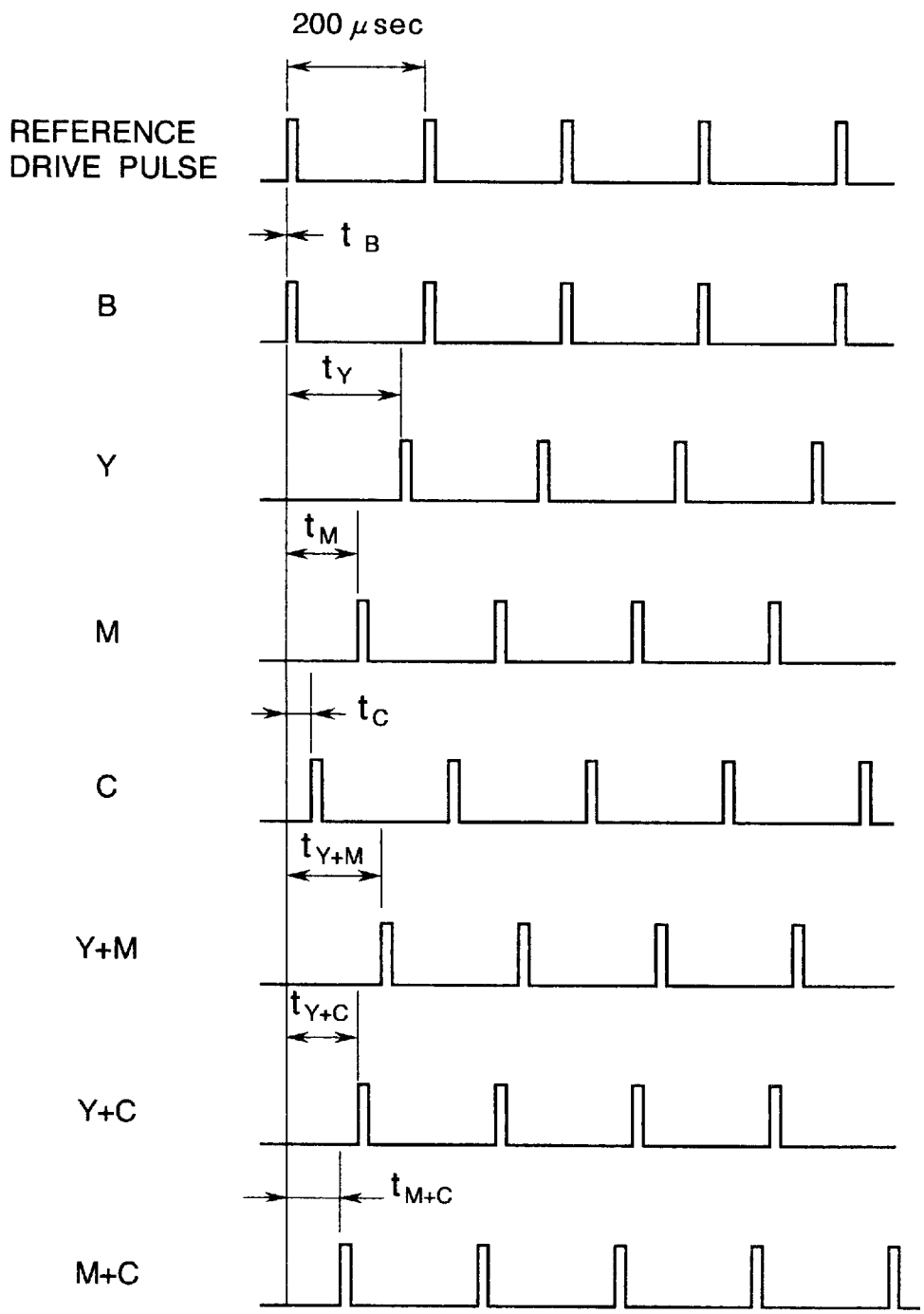
FIG. 5 illustrates the drive timing of the ink jet head according to the first embodiment.
Figure 6:
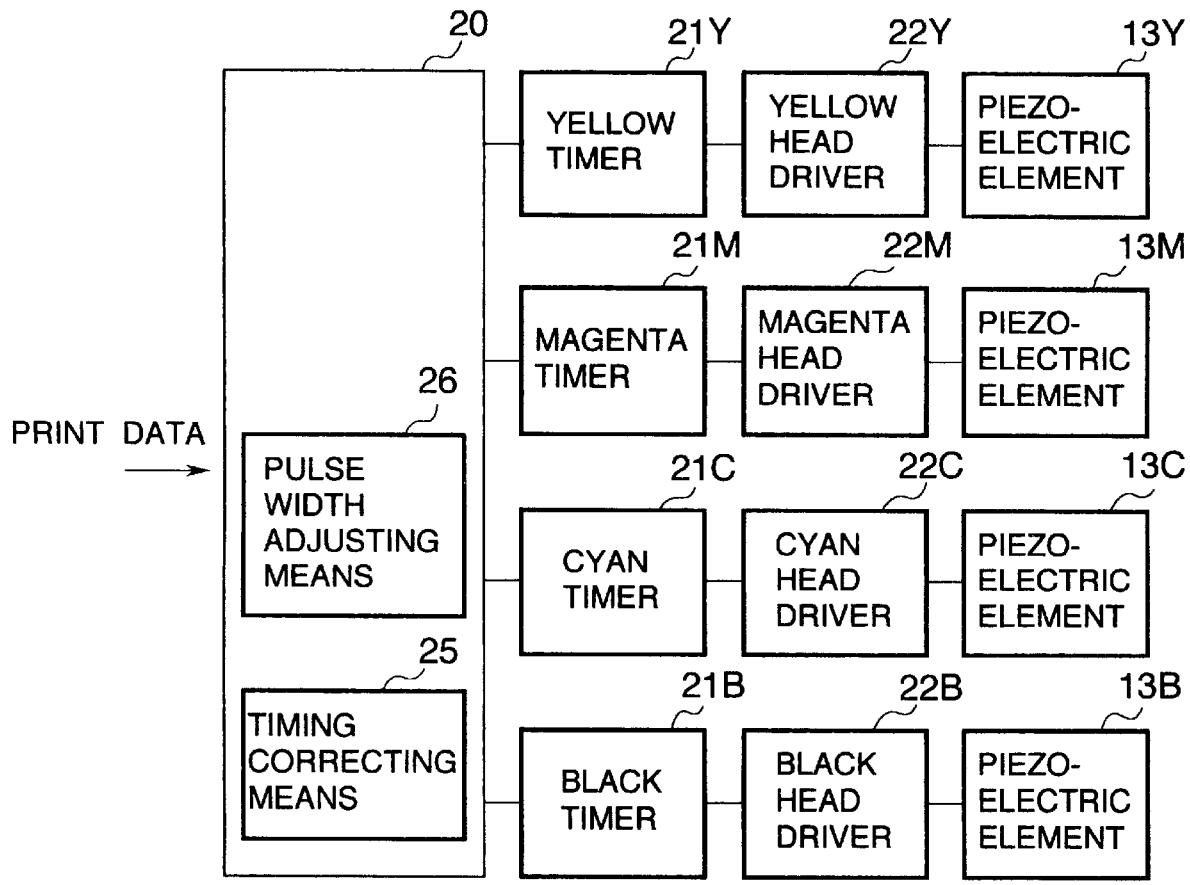
FIG. 6 is a block diagram showing a general construction of a controller of the ink jet head.

The drive timing of the ink jet head 15 will now be described. FIG. 5 illustrates the drive timing of the ink jet head 15 according to the first embodiment when ejecting a full sized ink drop. FIG. 6 is a block diagram showing a general construction of a controller of the ink jet head 15 of the first embodiment.

As shown in FIG. 6, a CPU 20 is connected to a yellow head driver 22Y, magenta head driver 22M, cyan head driver 22C and black head driver 22B via yellow timer 21Y, magenta timer 21M, cyan timer 21C, and black timer 21B, respectively. The head drivers 22Y, 22M, 22C, and 22B drive the piezoelectric elements 13Y, 13M, 13C, and 13B, respectively, in accordance with the color information.

The CPU 20 is provided with timing correction means 25, which sets the timers 21Y, 21M, 21C, and 21B for timing correction values for pulses which drive the piezoelectric elements 13Y, 13M, 13C, and 13B. The timings at which the ink drops are ejected from the ink pressure chambers of color inks are shifted by the corresponding timing correction value with respect to the timing at which a black ink drop is ejected. Thus, drive pulses for driving the respective ink pressure chambers are generated at the timings corrected by the timing correction values, and drive the piezoelectric elements 13Y, 13M, 13C, and 13B.

The correction values will be described in detail as follows: The following description assumes that the ink jet head 15 moves in the direction shown by arrow P in FIG. 1. The drive cycle of the ink jet head 15 is assumed to be five kHz and the resolution of the ink jet recording apparatus is assumed to be 300 dpi (dots per inch), i.e., pitch of printed dots is 85 $\mu$m. As shown in FIG. 5, the period of the reference drive pulse is given as follows:

$$\text{1/5000} = 200 \ \mu s \tag{1}$$

The black ink is ejected at the timing of the reference drive pulse. Thus, the timing correction value of the black ink is $t_B=0$. For yellow ink, the correction value is determined as follows:

$$t_Y = (200/85)\{L3 + (L1-L2) \tan \theta\} \tag{2}$$

Thus, cyan ink must be ejected at time $t_Y$ after the black ink is ejected. Likewise, the correction values for the other colors are determined as follows:

$$\text{For magenta, } t_M = (200/85)L3 \tag{3}$$

$$\text{For cyan, } t_C = (200/85)\{L3 - (L1-L2) \tan \theta\} \tag{4}$$

For the combination of yellow and magenta, $$t_{Y+M} = (200/85)\{L3 + (L1-L2) \tan (\theta/2)\} \tag{5}$$

For the combination of yellow and cyan, $$t_{Y+C} = t_M = (200/85)L3 \qquad (6)$$

For the combination of yellow and cyan, $$t_{Y+C} = (200/85)\{L3 - (L1-L2)\tan(\theta/2)\} \qquad (7)$$

Figure 7:
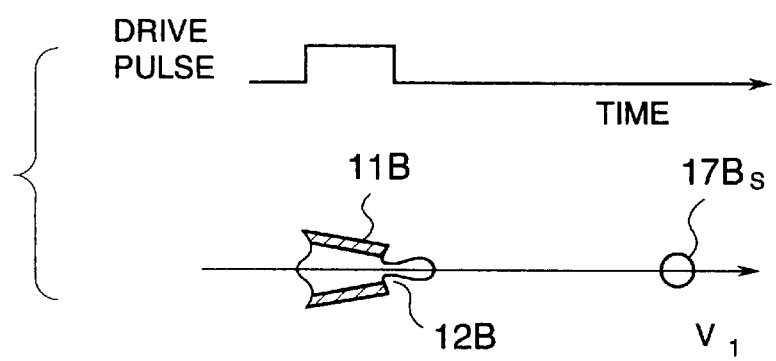
FIG. 7 illustrates the relationship between a narrow drive pulse and the corresponding size of ink drop.
Figure 8:
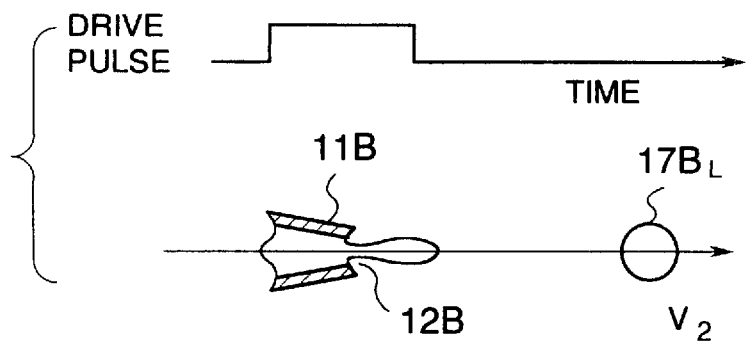
FIG. 8 illustrates the relationship between a wide drive pulse and the corresponding size of ink drop.

The amount of ink in the ink drop is controlled as follows. FIGS. 7 and 8 illustrate the relation between a drive pulse and the corresponding size of ink drop.

The width of the drive pulse applied to the piezoelectric element 13B is adjusted by the pulse width adjusting means 26 in the CPU 20, a narrow pulse resulting in a small drop 17B$_S$ as shown in FIG. 7, and a wide pulse resulting in a large ink drop 17B$_L$ as shown in FIG. 8. The width of drive pulses may be adjusted continuously or in increments of a sufficiently small amount so that a desired amount of ink drop may be produced. The ink drop 17B$_S$ is ejected at a velocity V1 and the ink drop 17B$_L$ at a velocity V2. The V1 is lower than the velocity V2 since the ink drop 17B$_S$ is driven by a narrower pulse than the ink drop 17B$_L$.

Likewise, the width of drive pulse applied to each of the other piezoelectric elements 13Y, 13M, and 13C is adjusted by the pulse width adjusting means 26, thereby varying the amounts of ink drops 17Y, 17M, and 17C, respectively.

Figure 9:
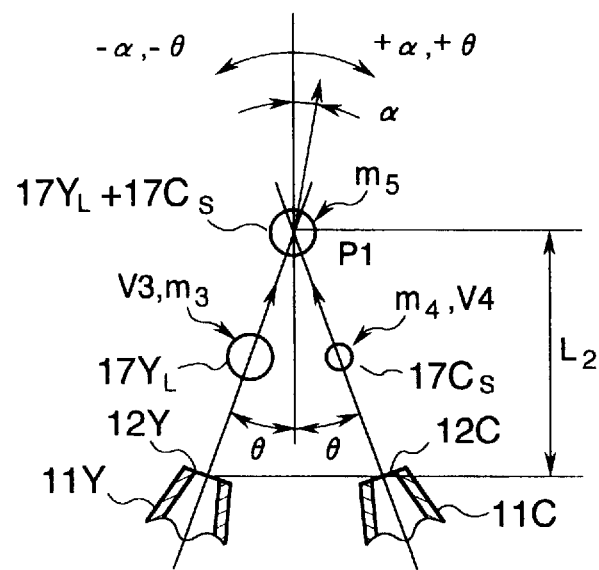
FIG. 9 illustrates ink drops ejected from the yellow ink pressure chamber 11Y and cyan ink pressure chamber 11C toward point P1, the ink drops having different sizes from each other.

One specific example is shown in FIG. 9, which illustrates ink drops ejected from the yellow ink pressure chamber 11Y and cyan ink pressure chamber 11C toward point P1. As shown in FIG. 9, an yellow ink drop 17Y$_L$ having a larger amount m3 may be merged with a cyan ink drop 17C$_S$ having a smaller amount m4 into a single ink drop at point P1, thereby producing a yellowish green ink drop 17Y$_L$+17C$_S$ having an amount of m5. The width of pulse applied to each of the ink pressure chambers 11Y and 11C is adjusted by the pulse width adjusting means to produce the ink drops 17Y$_L$ and 17C$_S$ having an amount of m3 and an amount of m4, respectively, so that the resultant amount m5 is substantially equal to the amount m1 of a full sized single color-ink drop.

The ink drop 17Y$_L$ is ejected at a velocity V3 and the ink drop 17C$_S$ at a velocity V4. The velocity V3 is faster than the velocity V4 since the ink drop 17Y$_L$ is driven by a wider pulse than the ink drop 17C$_S$. The time required for each ink drop to arrive at point P1 is determined as follows:

$$t3 = L2/(V3 \cos \theta) \qquad (8)$$

$$t4 = L2/(V4 \cos \theta) \qquad (9)$$

Time t3 is shorter than time t4 since V3>V4.

In order that the ink drops 17Y$_L$ and 17C$_S$ are merged into a single ink drop at point P1, each ink drop must be ejected at a proper timing in accordance with an amount of ink contained therein.

Figure 10:
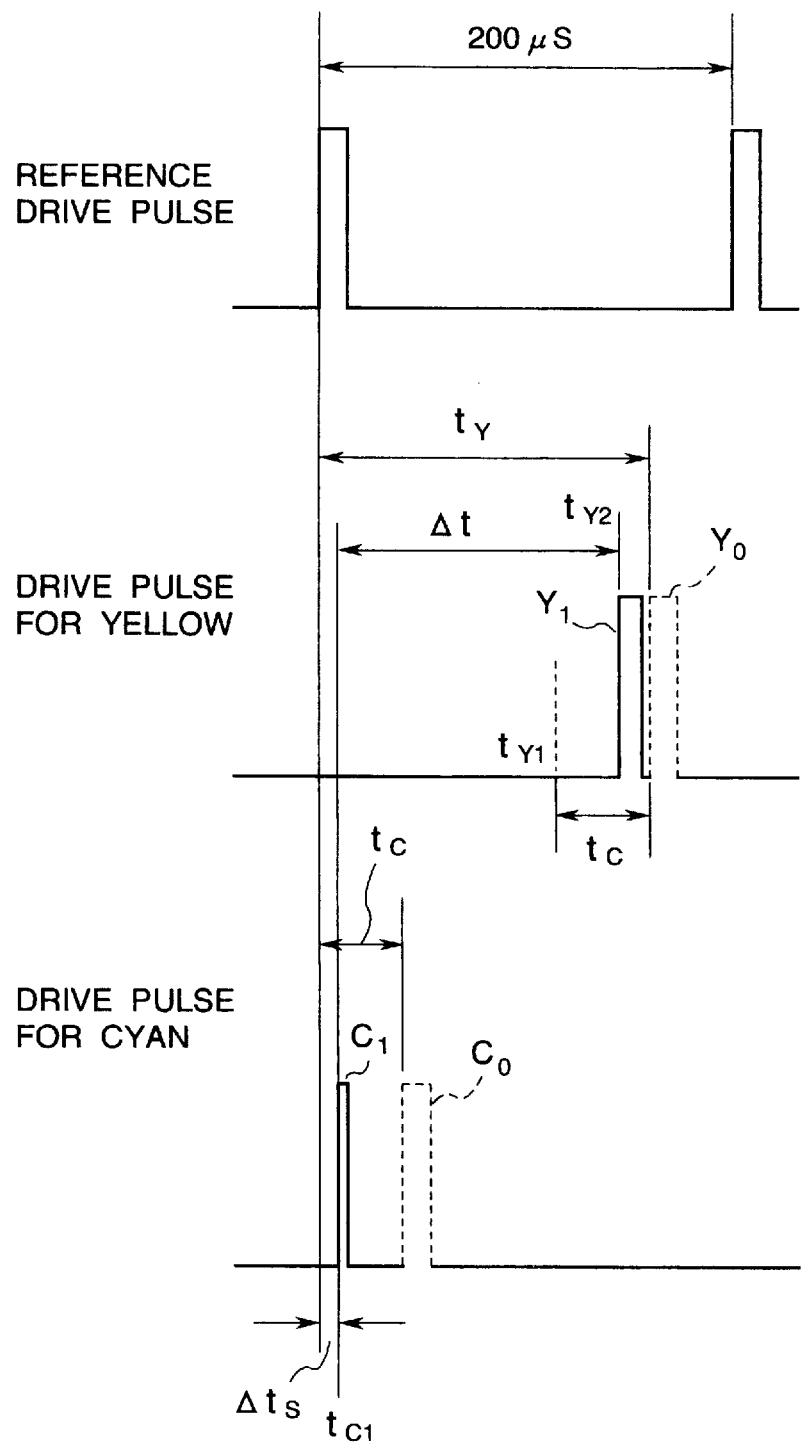
FIG. 10 illustrates the yellow ink drop $17Y_L$ delayed by $\Delta t$ with respect to the cyan ink drop $17C_S$ when the two ink drops have different sizes from each other.

FIG. 10 illustrates the timing at which ink drops 17Y$_L$ and 17C$_S$ are ejected. Drive pulses Y$_0$ and C$_0$ shown in dotted lines are the same as waveforms Y and C in FIG. 5, and indicate the timing at which a full sized ink drop of the respective color is ejected. The ink drop 17Y$_L$ has an amount of ink smaller than that contained in a full sized ink drop, and is therefore ejected by pulse Y$_1$ at time t$_{Y2}$, little earlier than pulse the Y$_0$, and the pulse Y$_1$ is narrower than the pulse Y$_0$. The ink drop 17C$_S$ has an amount of ink smaller than that contained in a full sized ink drop, and therefore the ink drop 17C$_S$ is ejected by pulse C$_1$ at time t$_{C1}$, earlier than the pulse C$_0$, and the pulse C$_1$ is narrower than the pulse C$_0$. The pulse C$_1$ is narrower than the pulse Y$_1$ since the ink drop 17C$_S$ has a less amount of ink than the ink drop 17Y$_L$, It is to be noted that the occurrence of the pulse C$_1$ with respect to the pulse for ejecting a full sized ink drop is earlier than that of the pulse Y$_1$.

As shown in FIG. 10, the ink drop 17Y$_L$ is ejected Δt=t4−t3 after the ink drop 17C$_S$ is ejected, so that the ink drops 17Y$_L$ and 17C$_S$ are merged into a single ink drop at the point P1.

The time length Δts is set to Δts=0 when the ink drop 17C$_S$ has a minimum possible amount of ink. The drive pulse for yellow ink occurs at time t$_{Y1}$ when the ink drop 17Y$_L$ has a minimum possible amount of ink.

FIG. 11 shows a table which lists the proportion when merging yellow ink and cyan ink, and the corresponding timing and angle α. The relative sizes of the ink drops can be adjusted to mix the basic colors (yellow, cyan, magenta) in different proportions, thereby obtaining different shades of color. The proportion ranges from 0 to n in FIG. 11. In other words, the colors between yellow and cyan are represented by the number n of colors. The ink drops 17Y$_L$ and 17C$_S$ each have an ink amount in increments of m$_0$, a minimum possible amount.

For proportion 1 where the ink drop 17Y$_L$ has a minimum possible value m$_0$, the angle α is −α1 which is slightly smaller than +θ and the timing for ink drop 17Y$_L$ is t$_{Y1}$ (t$_{Y1}$=t$_Y$-t$_C$).

For proportion k, the ink drops 17Y$_L$ and 17C$_S$ have the same amount of ink, i.e., m3=m4=m½, the ink drops 17Y$_L$ and 17C$_S$ are ejected at timing t$_{Y+C}$ (FIG. 5), and the angle α is zero degrees.

Proportion level i corresponds to the case shown in FIG. 10.

For proportion n−1 where the ink drop 17C$_S$ has a minimum possible value m$_0$, the angle α is +α1 which is slightly smaller than −θ and the timing for ink drop 17C$_S$ is the same as the reference drive pulse.

Since the two ink drops travel at different velocities and have different amounts of ink, the momentum of each ink drop is different from each other. The resultant ink drop 17Y$_L$+17C$_S$ travels in a direction shown by angle α. This direction is determined by the momenta of the two ink drops 17Y$_L$ and 17C$_S$. The timing correction values of drive pulses for the piezoelectric elements 13Y and 13C are determined by taking the angle of α into account so that the ink drop after merging still adheres accurately to a dot location where it is to be printed.

For other combinations of color inks, tables similar to FIG. 11 may be produced in a similar manner and description thereof is omitted.

In the first embodiment, an ink drop of a mixture of desired colors is produced before the resultant ink drop reaches the print medium 16. The orifices 12Y, 12M, and 12C eject ink drops having a proportion of ink amount different from one another in accordance with the print data. Each ink drop is ejected at different timing and initial velocity from others, and travels toward point P1 where the ink drops are merged into a single ink drop having the desired color. The merged ink drop has substantially the same amount of ink when reaching the print medium 16 regardless of whether the ink drop is of a single color or a mixture of different colors. This feature eliminates ink spread, color drift, and misregistration of dots, being effective in improving print quality.

As mentioned above, fine gradation may be achieved by adjusting the amount of ink in each ink drop of a mixture of different colors.

Gradation may also be achieved for a single color ink. FIG. 12 shows a table which lists gradation and the corresponding pulse width, timing, and amount of ink for magenta. The gradation is expressed in n levels and gradation 0 indicates white background. The amount $m_0$ represents a minimum possible amount of ink contained in an ink drop. Tables similar to FIG. 12 are produced for other colors in a similar manner and description thereof is omitted.

As mentioned above, the gradation in a single color or a mixture of different colors may be achieved by adjusting the amount of ink contained in each color ink drop, yet maintaining the same resolution of the ink jet recording apparatus and eliminating ink spread, color drift, and misregistration of dots.

Second Embodiment

Figure 13:
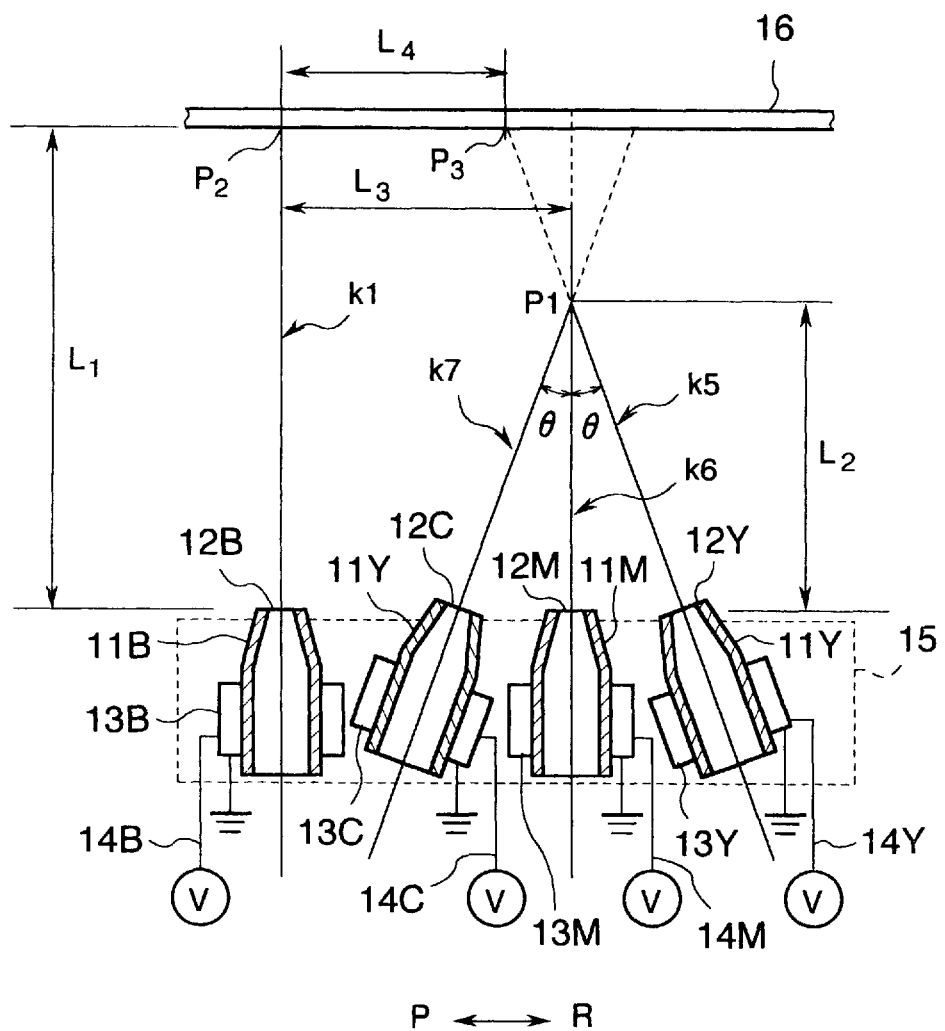
FIG. 13 illustrates a general construction of an ink jet head according to a second embodiment.

FIG. 13 illustrates a general construction of an ink jet head according to a second embodiment. Elements similar to those in the first embodiment have been given similar numerals and description thereof has been omitted. The second embodiment differs from the first embodiment in that each of the ink chambers 12Y and 12C is put in the place of the other. Accordingly, the timings at which yellow and cyan inks are ejected are different from the timings described in the first embodiment. Referring to FIG. 13, an ink pressure chamber 11B is disposed a distance L1 away from a print medium 16, and oriented so that ink is ejected along line k1 extending substantially perpendicular to a print medium 16 and adheres to the print medium at point P2. The ink pressure chambers 11Y, 11M, 11C are oriented so that the color inks are ejected along lines k5, k6, and k7, respectively, and merged into a single ink drop at point P1, which is located at a distance L2 away from the the ink pressure chambers and a distance L3 away from the line k1. The distance L2 is shorter than a distance L1. If the color inks are ejected at different timings with the result that the ink drops are not merged at point P1, the ink drops of yellow ink adhere to the print medium 16 at a location closer to the point P2 than other color ink drops.

L3 represents a distance from point P1, to line k1. L4 is a distance from point P2 to point P3. The line k6 makes angles of θ with lines k7 and k5, respectively. Distance L3 and angle θ are selected so that the distance L4 is longer than the distance between adjacent dots, which is greater than 85 μm if the resolution of the ink jet recording apparatus is 300 dpi.

When color inks are accidentally ejected while printing operation is being performed using black ink only, the respective color inks adhere to the print medium 16. Of the accidentally ejected color ink drops, yellow ink drop reaches a location on the print medium 16 closer to the black dots than the other color dots. However, if only yellow ink drops are accidentally ejected or the ejected yellow ink drops are not merged with other color ink(s), then the yellow ink drops adhere to the print medium 16 close to the printed black dots but do not significantly deteriorate the print quality of the image printed with black dots since yellow is a light color. The other color ink drops which are not merged with yellow color ink drops adhere to locations on the print medium 16 far away from the black dot image, not significantly deteriorating print quality. Therefore, the construction alleviates damages to the print quality of the image formed by black dots.

Third Embodiment

The velocities at which ink drops of the respective colors travel may be different from one another due to the variations in the characteristics of the piezoelectric elements 13Y, 13M, 13C, and 13B. Referring to FIG. 9 again, the yellow and cyan ink drops $17Y_L$ and $17C_S$ have momenta $m3V_Y$ and $m4V_C$, respectively, where $V_Y$ and $V_C$ are the velocities of the ink drops of $17Y_L$ and $17C_S$, respectively and m3 and m4 are ink amounts, i.e., weights of the ink drops $17Y_L$ and $17C_S$, respectively.

Figure 14:
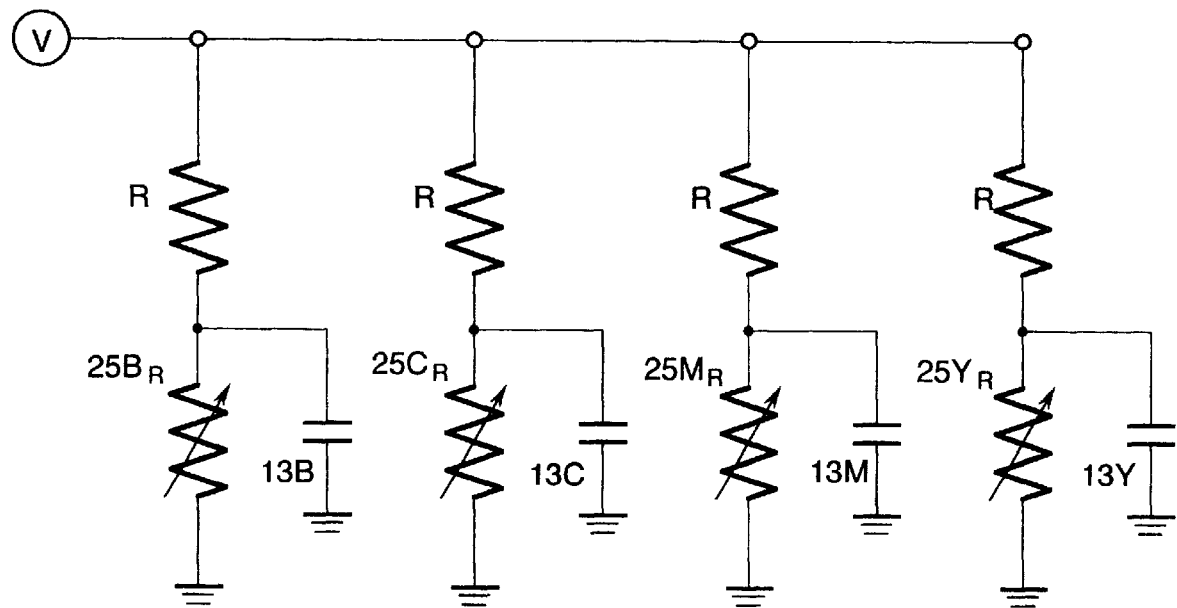
FIG. 14 shows a schematic diagram of the piezoelectric elements according to a third embodiment.

The differences in velocity and ink amount cause variations in angle α, the angle α being different from the value calculated for the case of the yellow and cyan ink drops $17Y_L$ and $17C_S$. The third embodiment is directed to a feature that a location on the print medium 16 to which a merged ink drop adheres may be corrected. FIG. 14 shows a schematic diagram of the piezoelectric elements according to the third embodiment.

Referring to FIG. 14, a power supply supplies electric power to the piezoelectric elements 13Y, 13M, 13C, and 13B via resistors R of the piezoelectric elements 13Y, 13M, 13C, and 13B and variable resistors $25Y_R$, $25M_R$, $25C_R$, and $25B_R$, respectively, so that the power supply voltage is divided by the series circuit of each piezoelectric element and the corresponding variable resistor. Adjusting the resistances of the variable resistors $25Y_R$, $25M_R$, $25C_R$, and $25B_R$ allows adjustment of the voltages applied to the respective piezoelectric elements 13Y, 13M, 13C, and 13B, thereby varying the amount of deformation of the respective piezoelectric elements 13Y, 13M, 13C, and 13B. Thus, adjusting the variable resistors $25Y_R$, $25M_R$, $25C_R$, and $25B_R$ allows precise setting of amount of ink in the respective ink drops ejected from the corresponding piezoelectric elements for the same pulse width. Precisely adjusting the amount of ink in the ink drops allows all the ink chambers 11Y, 11M, and 11C to eject ink drops having the same amount of ink for the same pulse width, resulting in the same velocity of ink drop for the same ink amount. The adjustment of the voltage of drive pulse eliminates variations in angle α, so that ink drops accurately adhere to the right locations on the print medium 16.

Even more accurate printing of ink dots can be obtained by the combined use of adjusting the amount of ink in an ink drop as shown in FIG. 14 and setting the timing of the drive pulse as shown in FIGS. 9–11.

Fourth Embodiment

Figure 15:
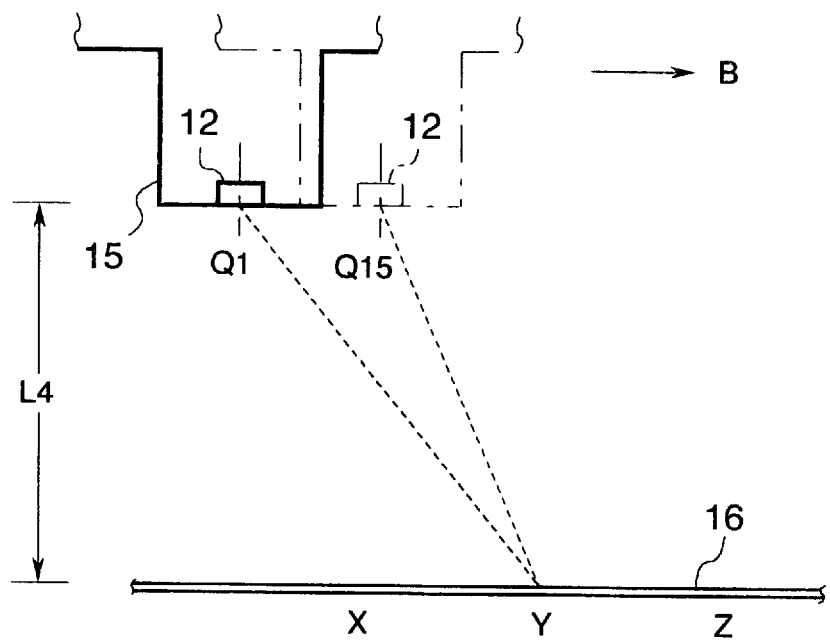
FIG. 15 illustrates a general construction of a fourth embodiment.

FIG. 15 illustrates a general construction of a fourth embodiment. Referring to FIG. 15, an ink jet head 15 is held at a distance L4 from a print medium 16. Nozzles, not shown, in the ink jet head 15 eject ink drops through orifices 12 toward the print medium 16 when the jet print head 15 moves in a direction shown by arrow B. The size of an ink drop is determined by print gradation data.

References X, Y, and Z indicate the locations of dots to be printed on the print medium 16. The dot locations X, Y, and Z vary depending on the designed resolution (e.g., 300 dpi) of the apparatus. The position of the ink jet head 15 from which the ink is ejected toward the position Y varies from Q1 to Q15 depending on the size of the ink drop. An ink drop having the smallest size is ejected at location Q1 toward the position Y and an ink drop having the largest size is ejected at location Q15. Thus, smaller ink drops travel longer distances than larger ink drops before they reach the same position Y.

The size of an ink drop is determined by the amount of energy given to the ink. Such energy takes the form of, for example, the voltage of drive pulse applied to the ink jet head 15 which depends on the print gradation data of a dot to be printed.

Figure 16:
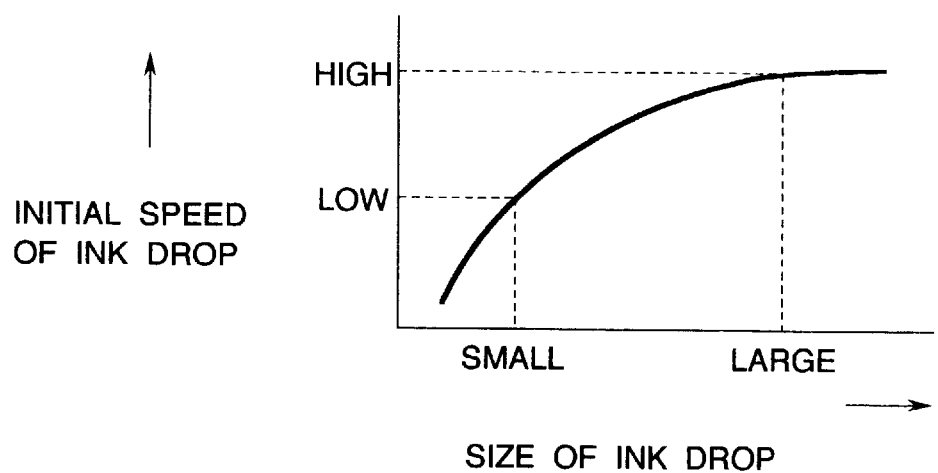
FIG. 16 illustrates the variation of initial velocity of ink drop with size of ink drop.

FIG. 16 illustrates the variation of velocity of ink drop with size of ink drop. As shown in FIG. 16, the initial velocity of an ejected ink drop decreases with decreasing size of the ink drop.

Figures 17, 18:
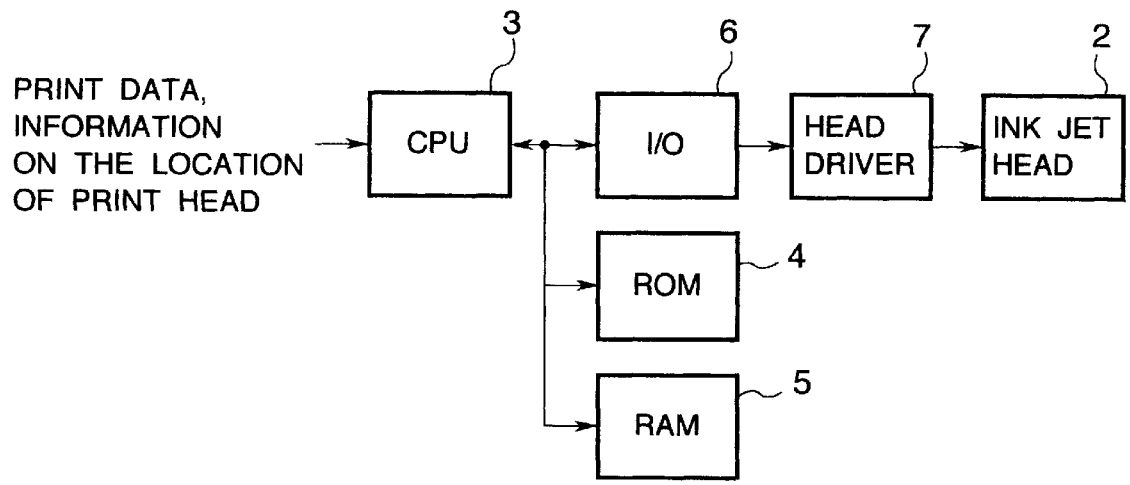
FIG. 17 is a block diagram showing a controller in the fourth embodiment.
FIG. 18 illustrates a table which lists print gradation data and the corresponding timing and voltage of drive pulse.

FIG. 17 is a block diagram showing a controller in the fourth embodiment. A central processing unit 3 (CPU) serves as timing correcting means and is connected to a ROM 4 that serves as timing storing means, input/output port (I/O) 6, and RAM 5 which stores print data and gradation data therein. The data is outputted via a head driver 7 to an ink jet head 2. Stored in the ROM 4 is a timing table as shown in FIG. 18 which lists print gradation data and the corresponding timing and drive voltage to be applied to the ink jet head 15. Gradation levels are listed in the order of low density, timing values in the order of early occurrence.

In the fourth embodiment, the gradation is defined in 16 levels, level "zero" being assigned to white background. Timing t1 corresponds to location Q1 and timing t15 corresponds to location Q15. Drive voltages are listed in the order of low voltage. Voltages V1–V15 represent energy to be applied to the ink and are determined by the size of ink drop and initial velocity thereof. As is clear from FIG. 18, the drive voltage increases with increasing gradation.

Figure 19:
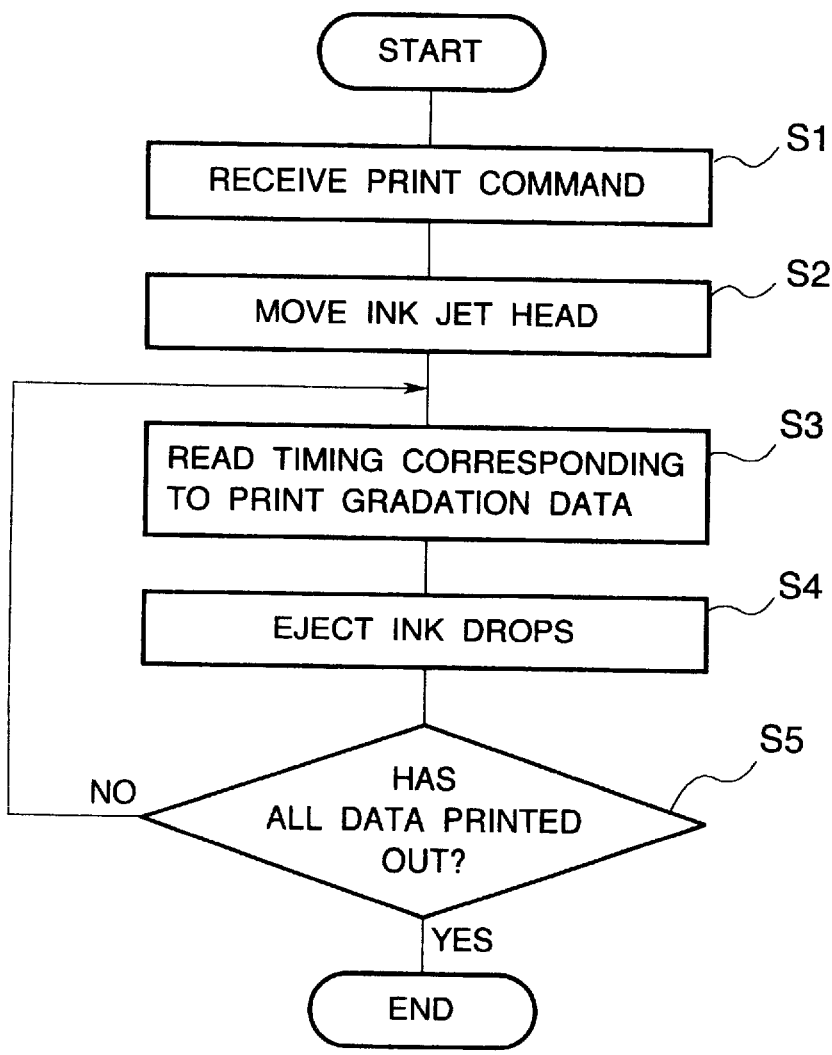
FIG. 19 is a flowchart illustrating the operation of the fourth embodiment.

The operation of the fourth embodiment will now be described with reference to a flowchart shown in FIG. 19. At step S1, upon receiving a print command and print data from a host apparatus, not shown, the CPU 3 reads print gradation data from the print data and causes the RAM 5 to store the print gradation data therein. At step S2, the CPU 3 causes a motor, not shown, to drive the ink jet head 2 to move in the direction shown by arrow B as shown in FIG. 15. The motor is provided with an encoder. A photo sensor detects the slits in the encoder and outputs a signal indicative of the position of the ink jet head 15 to the CPU 3.

At step S3, upon receiving the signal from the photo sensor, the CPU 3 reads the print gradation data from the RAM 5 and the corresponding timing and drive voltage from the ROM 4. At step S4, the CPU 3 causes the head driver 7 to drive the ink jet head 15 in accordance with the timing and drive voltage read from the ROM 4, so that smaller sized ink drops are ejected from the nozzle at earlier timings as shown in FIG. 15. At step S5, the CPU 3 determines whether all the print data has been printed out, and completes the print operation if YES, or returns to step S3 if NO.

While the fourth embodiment has been described with respect to the timing table in which gradation data, corresponding timing and drive voltage are listed, a specific equation may also be used to calculate the timing and drive voltage on the basis of the print gradation data.

The aforementioned embodiments are only exemplary and a variety of modifications may be made without departing from the scope of the invention.

What is claimed is:

1. An ink jet recording apparatus, comprising:

at least one ink chamber having an orifice through which ink is ejected to form dots on a print medium; and a controller coupled to said ink chamber and causing said ink chamber to move relative to the print medium while forming dots on the print medium in accordance with print data, said ink chamber ejecting at least one ink drop while moving relative to the print medium, the ink drop being comprised of a variable amount of ink corresponding to a level of gradation of the print data and being ejected at a timing corresponding to the amount of ink in the ink drop, said controller including a table which lists gradation levels and corresponding timings, said ink chamber being driven at the timings to eject the ink drop having the amount of ink corresponding to the level of gradation of the print data.

2. The ink jet recording apparatus according to claim 1, wherein the ink drop has a progressively small amount of ink with a decreasing level of gradation of the print data, said amount being smaller for a lower level of gradation, and the ink drop being ejected at a progressively earlier timing with a decreasing amount of ink.

3. An ink jet recording apparatus, comprising:

a plurality of ink chambers, each of which has an orifice through which corresponding color ink drops are ejected, said plurality of ink chambers comprising a group of ink chambers with each of the ink chambers of the group being oriented to eject ink drops in such directions so that the ink drops ejected from the ink chambers of the group merge into a single ink drop before reaching a print medium; and a controller coupled to said ink chambers for causing said ink chambers to eject respective corresponding color ink drops to the print medium by outputting a drive pulse in accordance with print data to drive each of the plurality of ink chambers so that each ink chamber ejects the respective corresponding color ink drop with an amount of ink in accordance with the print data, and with an amount of ink in accordance with a level of gradation of the print data, and at a timing corresponding to the amount of ink in the ink drop, wherein said controller operates either in a single-color print mode where a respective dot on the print medium is printed with a single color ink, or in a merged color print mode where each dot on the print medium is printed with a plurality of color inks merged into the single ink drop before reaching the print medium, said controller outputting the drive pulse for driving each of the ink chambers of said group to eject an ink drop having a first amount of ink in said single-color print mode, said controller outputting the drive pulse for driving each of the ink chambers of said group to eject an ink drop having a proportion of ink required for producing a desired resultant color in said merged color print mode such that the ink drops from the ink chambers of said group are merged into the single ink drop having an amount of ink substantially equal to said first amount of ink in said single-color print mode.

4. The ink jet recording apparatus according to claim 3, wherein said controller includes a timing correcting section for providing said drive pulse to each of the ink chambers of said group at a timing for a corresponding color in said merged color print mode, said timing being determined in accordance with the proportion of ink in the ink drops to be merged, and being determined relative to a timing at which black ink is ejected from a black ink chamber.

5. An ink jet recording apparatus, comprising:

a plurality of ink chambers, each of which has an orifice through which corresponding color ink drops are ejected, said plurality of ink chambers comprising a group of ink chambers with each of the ink chambers of the group being oriented to eject ink drops in such directions so that the ink drops ejected from the ink chambers of the group merge into a single ink drop before reaching a print medium; and a controller coupled to said ink chambers for causing said ink chambers to eject respective corresponding color ink drops to the print medium by outputting a drive pulse in accordance with print data to drive each of the plurality of ink chambers so that each ink chamber ejects the respective corresponding color ink drop with an amount of ink in accordance with the print data, and with an amount of ink in accordance with a level of gradation of the print data, and at a timing corresponding to the amount of ink in the ink drop, wherein said controller includes a timing correcting section for providing said drive pulse to each of the ink chambers of said group at a respective timing for a respective corresponding color, said respective timing being determined relative to a timing at which black ink is ejected from a black ink chamber.

6. The ink jet recording apparatus according to claim 5, wherein said timing correcting section provides said drive pulse to each of ink chambers of said group at a timing for corresponding color, said timing being determined in accordance with a level of gradation of the print data so that each of said ink drops is ejected in accordance with the level of gradation.

7. An ink jet recording apparatus, comprising:
a plurality of ink chambers, each of which has an orifice through which corresponding color ink drops are ejected, said plurality of ink chambers comprising a group of ink chambers with each of the ink chambers of the group being oriented to eject ink drops in such directions so that the ink drops ejected from the ink chambers of the group merge into a single ink drop before reaching a print medium; and
a controller coupled to said ink chambers for causing each of said plurality of ink chambers to eject respective corresponding color ink drops to the print medium in accordance with print data, each ink drop being ejected with an amount of ink in accordance with a level of gradation of the print data, and at a timing corresponding to the amount of ink in the ink drop, wherein said plurality of ink chambers includes a black ink chamber which ejects black ink drops in a direction substantially perpendicular to the print medium, said black ink chamber being oriented such that the ink drops ejected only from the ink chambers of said group are merged with one another.

8. An ink jet recording apparatus, comprising:
a plurality of ink chambers, each of which has an orifice through which corresponding color ink drops are ejected, said plurality of ink chambers comprising a group of ink chambers with each of the ink chambers of the group being oriented to eject ink drops in such directions so that the ink drops ejected from the ink chambers of the group merge into a single ink drop before reaching a print medium, and
a controller coupled to said ink chambers for causing each of said plurality of ink chambers to eject respective corresponding color ink drops to the print medium in accordance with print data, each ink drop being ejected with an amount of ink in accordance with a level of gradation of the print data, and at a timing corresponding to the amount of ink in the ink drop, wherein said group of ink chambers includes a yellow ink chamber for ejecting yellow ink drops, a cyan ink chamber for ejecting cyan ink drops, and a magenta ink chamber for ejecting magenta ink drops.

9. The ink jet recording apparatus according to claim 8, wherein said yellow ink chamber is oriented to eject yellow ink drops in such a direction that a printed yellow ink dot is closer to a black printed dot than ink dots formed by ink drops ejected from other ink chambers of said group.

10. An ink jet recording apparatus, comprising:

a group of ink chambers, each of said ink chambers holding different colored inks therein, each of said ink chambers having an orifice through which corresponding colored ink drops are ejected to a print medium, said ink chambers aiming at a same point between the print medium and the orifices; and
a controller coupled to said ink chambers and causing said ink chambers to eject the corresponding colored ink drops such that the ink drops ejected from said ink chambers are merged into a single ink drop at the point before reaching the print medium.

11. The ink jet recording apparatus according to claim 10, wherein said controller causes said ink chambers to eject ink drops at different timings depending on relative positions of said ink chambers.

12. The ink jet recording apparatus according to claim 10, wherein said controller causes said ink chambers to eject ink drops at different timings depending on an amount of ink in the ink drops.

13. The ink jet recording apparatus according to claim 10, further including a black ink chamber which holds black ink therein and ejects ink drops in a direction substantially perpendicular to the print medium; and
said controller generates drive pulses for driving said black ink chamber and said group of ink chambers so that each of the ink chambers ejects an ink drop having an amount of ink in accordance with print data, said controller including a timing correcting section for setting a respective timing of said drive pulses, said timing correction section outputting said drive pulses to said black ink chamber at a first timing and outputting said drive pulses to said group of ink chambers at second timings, said second timings being determined with respect to said first timing and being changed corresponding to a color of ink being ejected.

14. The ink jet recording apparatus according to claim 13, wherein said timings are determined in accordance with a level of gradation of the print data so that each of said ink drops is ejected in accordance with the level of gradation.

15. The ink jet recording apparatus according to claim 10, further comprising a black ink chamber which ejects black ink drops in a direction substantially perpendicular to the print medium, said black ink chamber being oriented such that only, the ink drops ejected from the ink chambers of said group are merged with one another.

16. The ink jet recording apparatus according to claim 10 wherein said group of ink chambers includes a yellow ink chamber for ejecting yellow ink drops, a cyan ink chamber for ejecting cyan ink drops, and a magenta ink chamber for ejecting magenta ink drops.

17. An ink jet recording apparatus, comprising:
a group of ink chambers, each of said ink chambers holding different colored inks therein, each of said ink chambers having an orifice through which corresponding colored ink drops are ejected to print dots on a print medium, each of said ink chambers aiming at a same point between the print medium and the orifices; and
a controller coupled to said ink chambers and causing said ink chambers to eject the corresponding colored ink drops, said controller selecting between a single-color print mode wherein ink drops of only one color are ejected to the print medium and a merged color print mode wherein ink drops of different colors are ejected from the ink chambers and are merged into a single ink drop at the point before reaching the print medium.

18. The ink jet recording apparatus according to claim 17, wherein the ink drops of only one color have a first size when said ink chambers operate in said single-color print mode, and the ink drops of different colors are proportioned in size to produce a desired resultant color when said ink chambers operate in said merged color print mode, the proportions being such that the single ink drop has a second size substantially the same as the first size.

* * * * *